United States Patent [19]
Sudau

[11] Patent Number: 5,937,987
[45] Date of Patent: Aug. 17, 1999

[54] MOTOR VEHICLE CLUTCH

[75] Inventor: Jörg Sudau, Niederwerrn, Germany

[73] Assignee: Mannesmann Sachs AG, Schweinfurt, Germany

[21] Appl. No.: 08/939,311

[22] Filed: Sep. 29, 1997

[30] Foreign Application Priority Data

Sep. 28, 1996 [DE] Germany .......................... 196 40 095

[51] Int. Cl.⁶ ................................................. F16D 13/50
[52] U.S. Cl. ..................................... 192/70.27; 192/70.28
[58] Field of Search ............................ 192/70.27, 70.28, 192/89.23

[56] References Cited

U.S. PATENT DOCUMENTS

| | | | |
|---|---|---|---|
| 2,154,117 | 4/1939 | Wolfram | 192/70.27 X |
| 2,234,756 | 3/1941 | Geyer | 192/70.27 X |
| 2,895,581 | 7/1959 | Lysett | 192/70.27 X |
| 3,392,812 | 7/1968 | Kaptur et al. | 192/99 |
| 3,570,638 | 3/1971 | Baker et al. | 192/70.27 X |
| 5,088,584 | 2/1992 | Inaba | 192/70.27 X |
| 5,125,872 | 6/1992 | Reik | 464/67 |
| 5,415,262 | 5/1995 | Bernal | 192/70.27 X |
| 5,715,920 | 2/1998 | Lindner et al. | 192/70.27 X |
| 5,794,753 | 8/1998 | Lkemper | 192/70.27 X |

FOREIGN PATENT DOCUMENTS

| | | | |
|---|---|---|---|
| 2 616 184 | 12/1988 | France | F16D 13/40 |
| 2 664 000 | 1/1992 | France | F16D 13/00 |
| 84 10 765 | 8/1984 | Germany . | |
| 3802955 | 9/1988 | Germany | 192/70.27 |
| 4106215 | 9/1991 | Germany | 192/70.27 |
| 41 29 044 | 4/1992 | Germany | F16D 13/71 |
| 44 20 934A1 | 4/1995 | Germany . | |
| 537927 | 7/1941 | United Kingdom . | |
| 2 102 085 | 6/1983 | United Kingdom | F16D 13/70 |
| 2 248 478 | 4/1992 | United Kingdom | F16D 13/75 |
| 2 266 125 | 10/1993 | United Kingdom | F16D 13/70 |

*Primary Examiner*—Charles A Marmor
*Assistant Examiner*—Ha Ho
*Attorney, Agent, or Firm*—Cohen, Pontani, Lieberman & Pavane

[57] ABSTRACT

A device for preventing torque peaks generated by an internal combustion engine in a motor vehicle from being introduced into its drive train. The device is connectable to the internal combustion engine via a friction clutch which is frictionally engaged on a flywheel mass. The friction clutch is arranged in a clutch housing which is fixedly connected with the flywheel mass so that said clutch housing rotates with said flywheel mass. A pressing plate is urged into frictional engagement with the friction clutch by a first spring element. The pressing plate is also frictionally engaged with the housing via a second spring element.

4 Claims, 1 Drawing Sheet

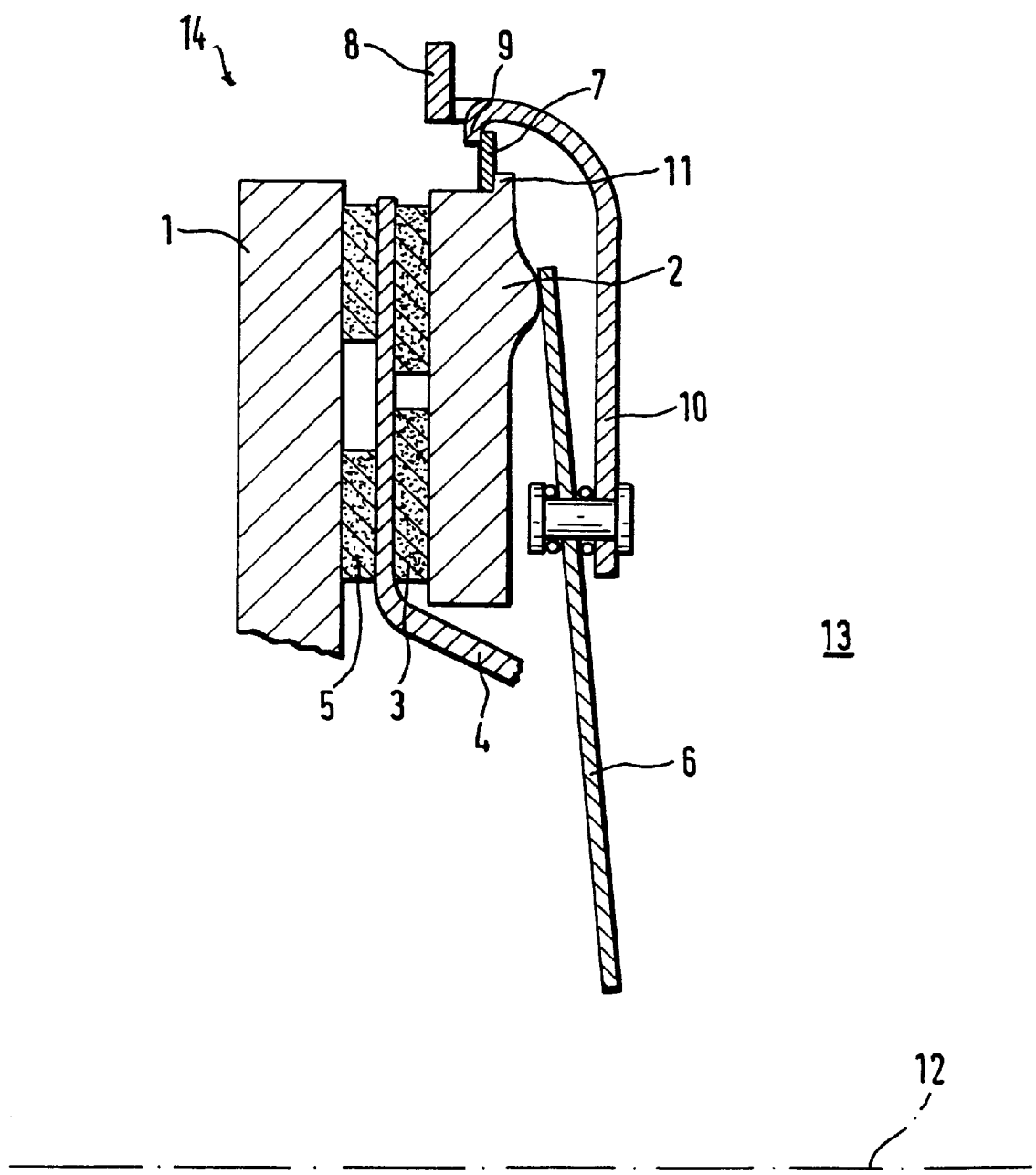

MOTOR VEHICLE CLUTCH

BACKGROUND OF THE INVENTION

1. Field of the Invention

The present invention relates to a device for preventing torque peaks generated by an internal combustion engine in a motor vehicle from being introduced into its drive train which is connectable with the internal combustion engine via a friction clutch acting on a flywheel mass. The friction clutch is arranged in a housing which is connectable with the flywheel mass so as to be fixed with respect to rotation relative thereto and the friction clutch has a pressing plate which is acted upon by a spring.

2. Description of the Related Art

A torque transmitting device is known, for example, from the German Utility Model G 84 10 765.0.

In connection with a two-mass flywheel, a slip clutch within a torque transmission device is known, for example, from DE 44 20 934 A1. Torque peaks or torque shocks are generated by the rough running of an internal combustion engine. In the known device, excessive torque shocks are prevented from being passed on to the subsequent drive train by a slip clutch positioned between the secondary flywheel mass and the carrier plate. The secondary flywheel mass is pressed against the carrier plate by two spring forces. The first of the two spring forces is via plate spring which acts on the friction facings of a pressing plate which are pressed onto the flywheel mass when the clutch is closed. The pressing plate is loaded axially by the plate spring. The second of the two spring forces is via a wave spring which is inserted between the clutch housing and the secondary mass. The torque transmission is effected on one side from the carrier plate connected with the crankshaft, through the secondary mass, the friction facings, and the pressing plate. On the other side, the torque transmission is effected through the carrier plate, the secondary mass, the wave spring, and the clutch housing. The torque transmission capability of this slip clutch is determined by the spring rates of the plate spring and of the wave spring and by appropriate choice of friction pairings at the friction faces. Since the secondary flywheel mass and the clutch are only connected with the carrier plate by a frictional engagement, a relative rotation of these parts occurs relative to the primary flywheel mass if the torque is too high.

The extreme torques occurring during a change of load and in the resonant range are prevented from resulting in the destruction of the two-mass flywheel, clutch disk or other structural component parts of the drive train because of this relative rotation capability.

A problem with this known construction is that it is quite cumbersome to assemble. A large number of structural component parts is needed to maintain the double frictional engagement. In addition, corresponding to the high logistical effort required to assemble these devices, the assembly costs are high. Also, the overall unit comprising the flywheel and clutch is correspondingly large in the axial direction due to the large number of structural component parts. Due to increasing vehicle optimization demand accompanied by a simultaneous increase in the multiplicity of equipment in vehicles, the available space in the engine compartment continuously decreases. For this reason, all structural component parts are required to be as compact as possible.

Proceeding from this set of problems, the generic device is to be improved in such a way that it requires fewer structural component parts, has a compact construction and is simple and economical to assemble.

SUMMARY OF THE INVENTION

It is an object of the present invention to provide a motor vehicle clutch having a pressing plate connected with the housing in a frictional engagement via a spring element.

As a result of the construction of the present invention, the pressing plate rotates relative to the housing when a torque overload occurs, while the closed clutch remains connected with the flywheel mass. The pressing plate can be provided in the housing as a preassembled unit. Assembly is very simple, since the pressing plate need only be inserted first against the force of the spring and the frictional engagement produced by subsequently inserting the spring element.

An advantage of this construction consists in that the capability of transmitting torque from the pressing plate to the clutch disk increases with the clutch engagement path, so that the slip phase of the clutch disk can be influenced by the characteristic curve of the spring element. This is a result of the increased torque transmission as the force of the plate spring increases.

The spring element is preferably a plate spring. In a further preferred embodiment form, the pressing plate has a circumferential shoulder which projects out radially and at which the inner radial area of the spring element is axially supported. The housing is provided with a plurality of tongues which are bent inward radially and which axially support the outer radial area of the spring element.

The resonant frequency of the housing is reduced by the construction of the tongues at the housing which can preferably be produced by punching.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

An embodiment example of the invention will be explained more fully in the following with reference to the drawing.

The single FIGURE is a sectional view of the torque transmission device of the present invention, the view being perpendicular to an axis of rotation of the torque transmission device.

DETAILED DESCRIPTION OF THE PRESENTLY PREFERRED EMBODIMENTS

Referring to the FIGURE, a torque transmission device 14 includes a clutch housing 10 which is substantially closed toward the rear in the direction of a drive train 13 (which is not shown here in greater detail). Clutch housing 10 accommodates within itself a pressing plate 2 and a plate spring 6 (or diaphragm spring) which is riveted to the clutch housing 10. A flywheel mass 1 is connected to a crankshaft, not shown, of an internal combustion engine so that the flywheel mass 1 is fixed with respect to rotation of the crankshaft. An axis of rotation for the torque transmission device 14 is designated as reference 12.

A clutch disk 4 is arranged between friction facings 3 and 5. The clutch disk 4 and friction facing plates 3 and 5 are positioned between the pressing plate 2 and the flywheel mass 1. When the clutch is in a closed position, the plate spring 6 presses the pressing plate 2 against the clutch disk 4 and the friction facing plates 3 and 5. Clutch disk 4 and the friction pressing plates 3 and 5 are pressed onto the flywheel mass 1.

At its side facing the pressure plate housing 10, the pressing plate 2 has a circumferential shoulder 11 which projects out radially from a outer perimeter of the pressing plate 2. Extending further in the direction of the internal combustion engine, the pressing plate housing 10 has a plurality of tongues 9 which project inward radially and which are preferably punched out of the pressing plate housing 10 and distributed symmetrically along the circumference thereof. The tongues 9 and the stop 11 form support locations for a second plate spring 7 arranged therebetween. The second plate spring 7 produces a frictional engagement between the pressing plate 2 and the housing 10. At the location designated by 8, the pressure plate housing 10 is connected with the flywheel mass 1 so as to be fixed with respect to rotation relative to it.

The amount of transmittable torque is determined by the choice of the spring force of the springs 6 and 7 and by the corresponding friction pairings. If the torque increases past a threshhold, a relative movement occurs between the pressing plate 2 and the housing 10 while the clutch 3, 4, 5 continues to rotate with the flywheel mass 1.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A device for preventing torque peaks generated by an internal combustion engine in a motor vehicle from being introduced into a drive train of the vehicle, comprising:

a flywheel mass for connecting to a crankshaft of said internal combustion engine;

a friction clutch frictionally engagable with said flywheel mass;

a clutch housing fixedly connected to said flywheel mass such that said housing rotates with said flywheel mass;

a pressing plate being urged into a frictional engagement with said friction clutch by a first spring element;

a torque-transmitting second spring element operatively frictionally connected between said pressing plate and said housing for establishing a second frictional engagement between said pressing plate and said housing via said second spring element; and said clutch housing being rotatable relative to said pressing plate via said second frictional engagement when an input torque at said clutch housing exceeds a torque transmitting threshold of said second frictional engagement.

2. The device of claim 1, wherein said second spring element is a plate spring.

3. The device of claim 1, wherein said pressing plate has a circumferential shoulder which projects out radially;

said shoulder axially supporting a radially inner area of said second spring element;

said housing having a plurality of tongues which are bent radially inward; and said tongues axially supporting a radially outer area of said second spring element.

4. The device of claim 3, wherein said tongues are punched out of said housing.

* * * * *